United States Patent
Nozawa et al.

(10) Patent No.: US 10,012,850 B2
(45) Date of Patent: Jul. 3, 2018

(54) LIGHT-TRANSMITTING RARE-EARTH GALLIUM GARNET CERAMIC, PROCESS FOR PRODUCING SAME, AND FARADAY ROTATOR

(71) Applicant: Konoshima Chemical Co., Ltd., Osaka (JP)

(72) Inventors: Hoshiteru Nozawa, Mitoyo (JP); Hideki Yagi, Mitoyo (JP); Takagimi Yanagitani, Mitoyo (JP)

(73) Assignee: Konoshima Chemical Co., Ltd., Osaka (JP)

( * ) Notice: Subject to any disclaimer, the term of this patent is extended or adjusted under 35 U.S.C. 154(b) by 718 days.

(21) Appl. No.: 14/397,943

(22) PCT Filed: Apr. 5, 2013

(86) PCT No.: PCT/JP2013/060474
§ 371 (c)(1),
(2) Date: Oct. 30, 2014

(87) PCT Pub. No.: WO2014/006947
PCT Pub. Date: Jan. 9, 2014

(65) Prior Publication Data
US 2015/0129816 A1 May 14, 2015

(30) Foreign Application Priority Data

Jul. 6, 2012 (JP) .................. 2012-152248

(51) Int. Cl.
| | |
|---|---|
| G02F 1/00 | (2006.01) |
| G02F 1/09 | (2006.01) |
| C04B 35/50 | (2006.01) |
| C04B 35/01 | (2006.01) |
| C04B 35/645 | (2006.01) |
| B29C 43/00 | (2006.01) |
| G02B 27/28 | (2006.01) |
| B29D 11/00 | (2006.01) |
| B29K 103/06 | (2006.01) |

(52) U.S. Cl.
CPC .......... *G02F 1/0036* (2013.01); *B29C 43/003* (2013.01); *C04B 35/01* (2013.01); *C04B 35/6455* (2013.01); *G02B 27/281* (2013.01); *G02F 1/09* (2013.01); *B29D 11/0074* (2013.01); *B29K 2103/06* (2013.01); *C04B 2235/3217* (2013.01); *C04B 2235/3224* (2013.01); *C04B 2235/3225* (2013.01); *C04B 2235/3286* (2013.01); *C04B 2235/3287* (2013.01); *C04B 2235/608* (2013.01); *C04B 2235/6567* (2013.01); *C04B 2235/6582* (2013.01); *C04B 2235/72* (2013.01); *C04B 2235/764* (2013.01); *C04B 2235/9653* (2013.01)

(58) Field of Classification Search
CPC combination set(s) only.
See application file for complete search history.

(56) References Cited

FOREIGN PATENT DOCUMENTS

| | | | | |
|---|---|---|---|---|
| EP | 2360511 | * | 8/2011 | ............... G02F 1/00 |
| EP | 2360511 A1 | | 8/2011 | |
| JP | 2008001556 | | 1/2008 | |

OTHER PUBLICATIONS

Zhang et al: "Growth and characterization of $Tb_3Ga_{5-x}Al_xO_{12}$ single crystal", Journal of Crystal Growth, Elsevier, Amsterdam, NL., vol. 306, No. 1, Jul. 19, 2007, pp. 195-199.

* cited by examiner

*Primary Examiner* — Monique Peets
(74) *Attorney, Agent, or Firm* — The Webb Law Firm

(57) ABSTRACT

There is provided a rare-earth gallium garnet ceramic having a high extinction ratio and a high light transmittance. The rare-earth gallium garnet ceramic contains, as a sintering aid, 5 mass ppm or more and 500 mass ppm or less of Ge calculated as metal, and 20 mass ppm or more and 250 mass ppm or less of Al calculated as metal.

8 Claims, 1 Drawing Sheet

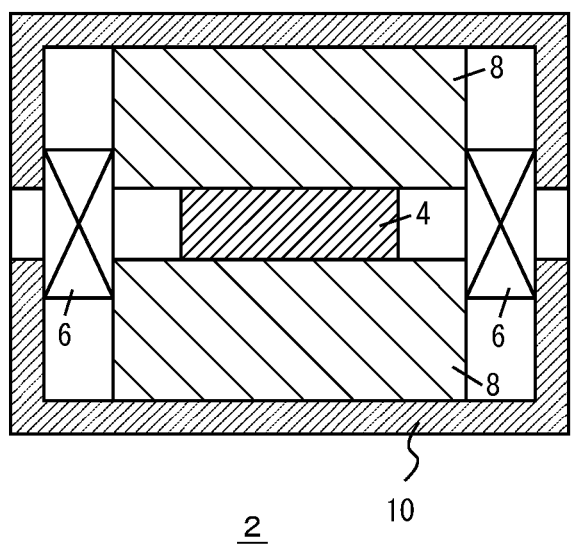

LIGHT-TRANSMITTING RARE-EARTH GALLIUM GARNET CERAMIC, PROCESS FOR PRODUCING SAME, AND FARADAY ROTATOR

CROSS-REFERENCE TO RELATED APPLICATIONS

This application is the United States national phase of International Application No. PCT/JP2013/060474 filed Apr. 5, 2013, and claims priority to Japanese Patent Application No. 2012-152248 filed Jul. 6, 2012, the disclosures of which are hereby incorporated in their entirety by reference.

TECHNICAL FIELD

The present invention relates to a translucent rare-earth gallium garnet ceramic, a method for producing the same, and a Faraday rotator that uses the ceramic, and particularly relates to an improvement of the extinction ratio of the ceramic.

BACKGROUND ART

The present inventors are now developing a Faraday rotator made of a polycrystalline garnet ceramic such as TGG ($Tb_3Ga_5O_{12}$). The first challenge in this development is to produce a ceramic having a high light transmittance, and the inventors have successfully achieved, for example, a linear light transmittance of 80.3% at a wavelength of 1500 nm and 78.5% at a wavelength of 600 nm for a 1-mm-thick sample by adding, as a sintering aid, 5 to 1000 mass ppm of Ge calculated as metal to TGG (Patent Literature 1: JP 4878343B).

Meanwhile, a Faraday rotator is required to have not only high translucency, but also a high extinction ratio. In practice, an extinction ratio of 30 dB or more is required. Therefore, the inventors have conducted studies to further improve the extinction ratio of the ceramic described in Patent Literature 1, and as a result, they achieved the present invention.

Another related art will now be described. A polycrystalline garnet ceramic can be applied to an X-ray scintillator, and Patent Literature 2: JP 2012-72331A proposes a ceramic having a composition $R_3(Al_{1-x}Ga_x)_5O_{12}$ where R is a rare-earth element, and $0<x<1$. Also, this composition formula indicates that the ratio between Al and Ga may be freely changed. In addition, Al and Ga are located at close positions in the periodic system, and have similar ionic radii. Accordingly, the Ga atoms in the ceramic can be replaced with Al atoms, and the crystal distortion, the change in the lattice constant, or the like that results from such replacement can be estimated to be small.

CITATION LIST

Patent Literature

Patent Literature 1: JP 4878343B
Patent Literature 2: JP 2012-72331A

SUMMARY OF THE INVENTION

Problems to be Solved by the Invention

It is an object of the present invention to provide a rare-earth gallium garnet ceramic having a high extinction ratio and a high light transmittance, a method for producing the same, and a Faraday rotator.

Means for Solving the Problem

According to the present invention, there is provided a translucent rare-earth gallium garnet ceramic represented by a general formula $R_3Ga_5O_{12}$ where R is at least one element selected from the group consisting of Y and rare-earth elements having an atomic number of 57 to 71, characterized by containing, as a sintering aid, 5 mass ppm or more and 500 mass ppm or less of Ge calculated as metal, and 20 mass ppm or more and 250 mass ppm or less of Al calculated as metal.

According to the present invention, there is also provided a Faraday rotator including a translucent rare-earth gallium garnet ceramic represented by a general formula $R_3Ga_5O_{12}$ where R is at least one element selected from the group consisting of Y and rare-earth elements having an atomic number of 57 to 71, characterized in that the translucent rare-earth gallium garnet ceramic contains, as a sintering aid, 5 mass ppm or more and 500 mass ppm or less of Ge calculated as metal, and 20 mass ppm or more and 250 mass ppm or less of Al calculated as metal.

A translucent rare-earth gallium garnet ceramic according to the present invention may be used, for example, as a Faraday rotator of an optical isolator, or may be doped with an element such as Nd or Er to serve as a laser material. A Faraday rotator is obtained by mirror-polishing both end faces of a translucent rare-earth gallium garnet ceramic, and providing the end faces with an anti-reflection coating. In the present specification, the statements regarding the translucent rare-earth gallium garnet ceramic directly apply to the Faraday rotator. The element R is preferably at least one selected from the group consisting of Y, Sm, Eu, Gd, Tb, Dy, Ho, Er, Tm, Yb, and Lu, and is particularly preferably Tb. Preferably, the translucent rare-earth gallium garnet ceramic contains 20 mass ppm or more and 200 mass ppm or less of Al. In the present specification, the concentrations of Al and Ge are expressed as a mass calculated as metal, based on the mass of the translucent rare-earth gallium garnet ceramic being 100 mass %. When a range is represented as being from 5 to 250 mass ppm, for example, the range includes the upper bound and the lower bound. "mass ppm" may be simply described as "ppm". As used herein, "rare earth" includes Y.

Table 1 shows the results obtained when the Ge concentration was fixed at 100 mass ppm and the Al concentration was changed in the range from 0 to 500 mass ppm. Note that Table 1 shows the results obtained without performing HIP. Even with 0 mass ppm of Al, the scattering coefficient is sufficiently small and the extinction ratio is within a tolerance at 1064 nm (the oscillation wavelength of a YAG laser). However, at 633 nm (the oscillation wavelength of a He—Ne laser), the scattering coefficient is large, and the extinction ratio is small. Here, doping 10 mass ppm of Al does not improve the scattering coefficient or the extinction ratio. In contrast, doping 20 mass ppm of Al reduces the scattering coefficient and also improves the extinction ratio at 1064 nm. Furthermore, the scattering coefficient and the extinction ratio at 633 nm are significantly improved. This effect is not limited to 20 mass ppm of Al, and the same or greater effect is achieved for a range in which Al is slightly smaller than 200 mass ppm. When Al is 200 mass ppm, the characteristics are slightly reduced, and the characteristics are significantly reduced when Al is 250 ppm. When Al is 500 mass ppm, the characteristics obtained are lower than those obtained without Al addition. As described above, high characteristics can be achieved when the Al concentration is 20 to 250 mass ppm, in particular, 20 to 200 mass ppm. The effect of decreasing the scattering coefficient and increasing the extinction ratio is produced by a combination of 5 to 500 mass ppm of Ge and 20 to 250 mass ppm of Al, and is not produced by, for example, a combination of 2 mass ppm of Ge and 50 mass ppm of Al (Com. Ex. 4 in Table 1) or a combination of 1000 mass ppm of Ge and 50 mass ppm of Al (Com. Ex. 5 in Table 1).

According to the present invention, even without HIP, the extinction ratio at 1064 nm can be basically 34 dB or more, and can be 35 dB or more depending on the selection of the firing time and the like, and the extinction ratio at 633 nm can be basically 31 dB or more, and can be 33 dB or more depending on the selection of the firing time and the Al concentration. By subjecting the fired ceramic to HIP (hot isostatic pressurized heat treatment), it is possible to further improve the extinction ratio and further decrease the scattering coefficient at 633 nm. Note that the extinction ratio and the scattering coefficient are significant for wavelengths other than specific absorption wavelengths.

According to the present invention, there is provided a method for producing a translucent rare-earth gallium garnet ceramic represented by a general formula $R_3Ga_5O_{12}$ where R is at least one element selected from the group consisting of Y and rare-earth elements having an atomic number of 57 to 71, characterized by including:

a step of preparing a rare earth oxide powder having a purity of 99.9% or more and containing, as a sintering aid, 5 mass ppm or more and 500 mass ppm or less of Ge calculated as metal and 20 mass ppm or more and 250 mass ppm or less of Al calculated as metal;

a step of molding the powder with addition of a binder into a molded article having a molding density of 55% or more relative to a theoretical density; and a step of heat-treating the molded article to remove the binder, followed by firing in hydrogen, a rare gas, a mixed gas of hydrogen and a rare gas, or in vacuum at 1250° C. to 1450° C. for 0.5 hours or more and 72 hours or less.

The molding density is preferably high, and is set to, for example, 70% or less from the viewpoint of the conditions that facilitate molding. The firing time is set to preferably 2 hours or more. Since the firing is preferably performed for a long time, the upper limit is set to 72 hours, and more practically the upper limit is set to 24 hours. The firing time means the holding time at the top temperature, for example. As shown in Table 3, a molding density of 55% or more can significantly decrease the scattering coefficient and significantly increase the extinction ratio. As shown in Table 4, firing at 1250° C. or more and 1450° C. or less can decrease the scattering coefficient and increase the extinction ratio, and firing for 0.5 hours or more can decrease the scattering coefficient and increase the extinction ratio. The firing atmosphere is hydrogen, a rare gas such as Ar, a mixed gas of hydrogen and a rare gas, or vacuum. Within the above-described range, the same result can be obtained even if the atmosphere is changed.

Preferably, a step of subjecting the ceramic obtained by the firing to a hot isostatic pressurized heat treatment at a treatment temperature of 1000° C. to 1450° C. and a pressure of 45 MPa to 200 MPa is performed. As shown in Table 5, HIP significantly improves the extinction ratio.

BRIEF DESCRIPTION OF DRAWINGS

FIG. 1 is a cross-sectional view of an optical isolator according to examples.

DESCRIPTION OF EMBODIMENT

The following describes examples of the present invention, and the examples can be modified by adding known technology thereto.

EXAMPLES

Example 1

Terbium oxide having a purity of 99.95% or more was dissolved in nitric acid, and gallium nitrate also having a purity of 99.95% or more was dissolved in ultrapure water, thus preparing a terbium nitrate solution with a concentration of 1 mol/L and a gallium nitrate solution with a concentration of 1 mol/L. Next, 300 mL of the above-described terbium nitrate solution, 500 mL of the above-described gallium nitrate solution, and 150 mL of an aqueous ammonium sulfate solution with a concentration of 1 mol/L were mixed, and ultrapure water was added thereto to bring the total volume to 10 L. While the resulting liquid mixture was being stirred, an aqueous ammonium hydrogen carbonate solution with a concentration of 0.5 mol/L was added thereto at a dropping rate of 5 mL/min until the pH reached 8.0, and all were cured at room temperature for two days under continuous stirring. After curing, the resultant was repeatedly filtered and washed with ultrapure for several times, and thereafter placed in a dryer at 150° C. and dried for two days. The resulting precursor powder was placed in an alumina crucible, and calcined in an electric furnace at 1100° C. for 3 hours. Thus, a terbium-gallium-garnet (TGG) starting powder (with a purity of 99.95 mass % or more and a Ge content of less than 5 mass ppm and an Al content of less than 5 mass ppm) having a specific surface area of 6.0 m²/g was produced.

To 75 g of the starting powder obtained, 50 g of ethanol as a solvent, 0.75 g of polyvinyl alcohol (PVA) as a binder, 0.75 g of polyethylene glycol (PEG) as a plasticizer, and 0.375 g of stearic acid as a lubricant were added. Note that the type and concentration of the binder and the like may be freely selected. $GeO_2$ and $Al_2O_3$ were added to the above-described starting powder as sintering aids such that the Ge content and the Al content, each calculated as metal, in the sintered body are 100 mass ppm and 50 mass ppm, respectively. Using a nylon pot and nylon balls, the above-described material mixture was subjected to ball mill mixing for 100 hours. The resulting mixed powder was subjected to a spray dryer (spray drying) to produce granules. The dried spherical bodies were placed in a 5-mm-diameter mold, and subjected to primary molding at 20 MPa, followed by molding at a pressure of 250 MPa by cold isostatic pressing (CIP), to produce a molded article having a relative density according to Archimedes' Principle of 59.8%. The molded article was heated to 600° C. at 10° C./hr, and held at this temperature for 20 hours to remove the binder, the plasticizer, and the lubricant. Further, in order to fully remove the binder and the like, the molded article was heated to 1100° C., and held for 10 hours. Thereafter, the molded article was fired and held at 1350° C. for 8 hours in a vacuum furnace. The degree of vacuum inside the furnace was $10^{-1}$ Pa or less.

Both ends of the resulting ceramic (diameter of 3 mm×length of 25 mm) were cut by a diamond saw cutting machine, and both end faces thereof were mirror-polished using a diamond slurry (no anti-reflection coating was provided). For the obtained ceramic with a diameter of 3 mm×length of 20 mm, the extinction ratio and the scattering coefficient at wavelengths of 1064 nm (YAG laser) and 633 nm (He—Ne laser) were measured. In the measurement of the extinction ratio, the amount of transmitted light was measured without application of a magnetic field, with a polarizing plate disposed on both sides of the ceramic. Then, one of the polarizing plates is rotated by 360 degrees, and the extinction ratio was determined using Equation 3), based on the ratio between a maximum value and a minimum value of the amount of transmitted light.

The scattering coefficient and the extinction ratio were calculated in accordance with the following equations, and the same measurement method was used for all samples.

Scattering Coefficient $\alpha = ((TGG \text{ Theoretical Transmittance}) - ((W_2/W_1) \times 100))/\text{Sample Length(cm)}$   1)

$W_1$: The value of laser intensity when the ceramic was not placed.
$W_2$: The value of laser intensity when the ceramic is put in the optical path.

$TGG$ Theoretical Transmittance $= (((R-1)^2/(R+1)^2) - 1)^2 \times 100$ ($R$: refractive index)   2)

(At 1064 nm, the refractive index was 1.95 and the TGG theoretical transmittance T was 80.3%)
(At 633 nm, the refractive index was 1.98 and the TGG theoretical transmittance T was 79.5%)

Extinction ratio $E = 10 \times \text{Log}_{10}(W_4/W_3)$   3)

$W_3$: Minimum value of laser intensity when the polarizing plate was rotated, with the ceramic put on the optical path.
$W_4$: Maximum value of laser intensity when the polarizing plate was rotated, with the ceramic put on the optical path.

Examples 2 to 9 and Comparative Examples 1 to 5

Translucent rare-earth garnet ceramics were produced in the same manner as in Example 1 except that the Ge concentration and the Al concentration were changed. The performance of these samples was shown in Table 1.

When the Al concentration is less than 20 mass ppm, the extinction ratio and the scattering coefficient were substantially the same as those of TGG containing only 100 mass ppm of Ge, and the effect of Al addition was not observed. When the Al concentration exceeds 250 mass ppm, the scattering coefficient was increased, and the extinction ratio was reduced. When the Ge concentration is less than 5 mass ppm or greater than 500 mass ppm, the scattering coefficient was decreased, and the extinction ratio was reduced. As such, a combination of 20 to 250 mass ppm of Al and 5 to 500 mass ppm of Ge specifically improved the extinction ratio, and also decreased the scattering coefficient. When the Ge concentration calculated as metal is 5 mass ppm or more and 500 mass ppm or less, and the Al concentration calculated as metal is 20 mass ppm or more and 250 mass ppm or less, the extinction ratio was 30 dB or more and the scattering coefficient was 1%/cm or less at wavelengths of 1064 nm and 633 nm. Note that the produced ceramics have a large optical path length of 20 mm, whereas the optical path length described in Patent Literature 1 is 1 mm. In addition, when the Al content calculated as metal exceeds 250 mass ppm, the extinction ratio is reduced and the scattering coefficient is increased, but the cause of this is unknown.

Examples 10 to 19

Table 2 shows the extinction ratio and the scattering coefficient of translucent rare-earth gallium garnet ceramics produced in the same manner as in Example 1 except that the element Tb was replaced with Y, Sm, Eu, Gd, Dy, Ho, Er, Tm, Yb or Lu. Note that no measurement was carried out when there was a specific absorption at the measurement wavelength 633 nm or 1064 nm. The extinction ratio and the scattering coefficient were comparable with those in Example 1, and it can thus be seen that the effect of Al addition is also effective when the element Tb was replaced with other rare-earth elements such as Y, Sm, Eu, Gd, Dy, Ho, Er, Tm, Yb, and Lu.

TABLE 1

Examples 1 to 9, Comparative Examples 1 to 5

| Sample | Sample conditions | | Extinction ratio/dB (Measurement wavelength 633 nm) | Extinction ratio/dB (Measurement wavelength 1064 nm) | Scattering coefficient/%/cm (Measurement wavelength 633 nm) | Scattering coefficient/%/cm (Measurement wavelength 1064 nm) |
| --- | --- | --- | --- | --- | --- | --- |
| | Ge | Al | | | | |
| Ex. 1 | 100 mass ppm | 50 mass ppm | 38 | 40 | 0.4 | 0.1 |
| Com. Ex. 1 | 100 mass ppm | 0 mass ppm | 29 | 34 | 1.1 | 0.2 |
| Com. Ex. 2 | 100 mass ppm | 10 mass ppm | 27 | 34 | 1.1 | 0.2 |
| Ex. 2 | 100 mass ppm | 20 mass ppm | 35 | 37 | 0.5 | 0.1 |
| Ex. 3 | 100 mass ppm | 100 mass ppm | 36 | 39 | 0.4 | 0.1 |
| Ex. 4 | 100 mass ppm | 200 mass ppm | 34 | 37 | 0.7 | 0.2 |
| Ex. 5 | 100 mass ppm | 250 mass ppm | 32 | 35 | 0.9 | 0.3 |
| Com. Ex. 3 | 100 mass ppm | 500 mass ppm | 25 | 29 | 2.3 | 1.1 |
| Ex. 6 | 5 mass ppm | 50 mass ppm | 35 | 37 | 0.9 | 0.2 |
| Ex. 7 | 50 mass ppm | 50 mass ppm | 37 | 39 | 0.5 | 0.2 |
| Ex. 8 | 250 mass ppm | 50 mass ppm | 36 | 38 | 0.4 | 0.1 |
| Ex. 9 | 500 mass ppm | 50 mass ppm | 35 | 35 | 0.5 | 0.1 |
| Com. Ex. 4 | 2 mass ppm | 50 mass ppm | 25 | 28 | 2 | 0.3 |
| Com. Ex. 5 | 1000 mass ppm | 50 mass ppm | 24 | 26 | 5.1 | 3.4 |

TABLE 2

Examples 10 to 19

| Sample | Compound | Extinction ratio/dB (Measurement wavelength 633 nm) | Extinction ratio/dB (Measurement wavelength 1064 nm) | Scattering coefficient/%/cm (Measurement wavelength 633 nm) | Scattering coefficient/%/cm (Measurement wavelength 1064 nm) |
|---|---|---|---|---|---|
| Ex. 10 | $Y_3Ga_5O_{12}$ | 38 | 40 | 0.4 | 0.1 |
| Ex. 11 | $Sm_3Ga_5O_{12}$ | 37 | — | 0.4 | — |
| Ex. 12 | $Eu_3Ga_5O_{12}$ | — | 39 | — | 0.1 |
| Ex. 13 | $Gd_3Ga_5O_{12}$ | 38 | 40 | 0.4 | 0.1 |
| Ex. 14 | $Dy_3Ga_5O_{12}$ | 37 | — | 0.4 | — |
| Ex. 15 | $Ho_3Ga_5O_{12}$ | — | 39 | — | 0.1 |
| Ex. 16 | $Er_3Ga_5O_{12}$ | — | 39 | — | 0.1 |
| Ex. 17 | $Tm_3Ga_5O_{12}$ | 37 | 39 | 0.4 | 0.1 |
| Ex. 18 | $Yb_3Ga_5O_{12}$ | 38 | — | 0.4 | — |
| Ex. 19 | $Lu_3Ga_5O_{12}$ | 39 | 40 | 0.4 | 0.1 |

Examples 20 to 22 and Comparative Examples 6 to 8

Ceramics were produced in the same manner as in Example 1 except that the molding pressure during CIP molding was changed to change the density of molded articles. Table 3 shows the relationship of the extinction ratio and the scattering coefficient with respect to the molding density. As the molding density is increased, the extinction ratio is increased and the scattering coefficient is reduced. When the molding density during molding is low, residual pores resulting from sintering failure are present in portions other than the densified portion. Consequently, the scattering coefficient is increased, and the extinction ratio is reduced. From the results shown in Table 3, it can be seen that a molding density of 55% or more is required to obtain a ceramic having an extinction ratio of 30 dB or more and a scattering coefficient of 1%/cm or less at wavelengths of 1064 nm and 633 nm.

TABLE 3

Examples 20 to 22, Comparative Examples 6 to 8

| Sample | Molding density/% | Extinction ratio/dB (Measurement wavelength 633 nm) | Extinction ratio/dB (Measurement wavelength 1064 nm) | Scattering coefficient/%/cm (Measurement wavelength 633 nm) | Scattering coefficient/%/cm (Measurement wavelength 1064 nm) |
|---|---|---|---|---|---|
| Com. Ex. 6 | 48.1 | 25 | 27 | 6.7 | 4 |
| Com. Ex. 7 | 50.9 | 27 | 30 | 5.6 | 2.9 |
| Com. Ex. 8 | 53.8 | 29 | 32 | 4 | 2.4 |
| Ex. 20 | 55.7 | 36 | 39 | 0.5 | 0.2 |
| Ex. 21 | 60.2 | 38 | 40 | 0.4 | 0.1 |
| Ex. 22 | 63.5 | 38 | 40 | 0.4 | 0.1 |

Examples 23 to 29 and Comparative Examples 9 to 14

Table 4 shows the extinction ratio and the scattering coefficient of ceramics produced in the same manner as in Example 1 except that the firing temperature and the firing time were varied. Note that the firing time is the holding time at the top temperature. When the firing temperature is 1100° C., a dense ceramic cannot be obtained, and neither the extinction ratio nor the scattering coefficient was measured. The ceramic for which the firing temperature was 1200° C. had a relative density of 99% or more, but had a low translucency. SEM observation of the microstructure of the ceramic showed the presence of many pores. When the firing temperature was 1250° C. to 1450° C., the extinction ratio was increased to 30 dB or more and the scattering coefficient was reduced to 1%/cm or less at wavelengths of 1064 nm and 633 nm. However, even when the firing temperature was 1250° C. to 1450° C., the pores were not sufficiently removed when the firing time was less than 0.5 hours, although the crystal particles were sufficiently grown. Thus, a satisfactory translucent ceramic was not obtained. When the firing temperature exceeds 1450° C., abnormal grain growth occurred in a part of the microstructure, and thus the pores were not sufficiently removed, resulting in a reduction in the extinction ratio and an increase in the scattering coefficient. From the foregoing, the firing temperature is preferably 1250° C. to 1450° C., and the firing time is preferably 0.5 hours or more.

TABLE 4

Examples 23 to 29, Comparative Examples 9 to 14

| Sample | Firing temperature/° C. | Firing time/hr | Extinction ratio/dB (Measurement wavelength 633 nm) | Extinction ratio/dB (Measurement wavelength 1064 nm) | Scattering coefficient/%/cm (Measurement wavelength 633 nm) | Scattering coefficient/%/cm (Measurement wavelength 1064 nm) |
|---|---|---|---|---|---|---|
| Com. Ex. 9 | 1100 | 8 | — | — | — | — |
| Com. Ex. 10 | 1200 | 8 | 15 | 20 | 10.4 | 6.4 |
| Ex. 23 | 1250 | 8 | 32 | 34 | 0.8 | 0.4 |
| Com. Ex. 11 | 1250 | 0.2 | 23 | 25 | 5.2 | 2.6 |
| Ex. 24 | 1350 | 2 | 33 | 35 | 0.6 | 0.2 |
| Ex. 25 | 1350 | 5 | 37 | 39 | 0.4 | 0.1 |
| Ex. 26 | 1400 | 8 | 35 | 38 | 0.5 | 0.2 |
| Com. Ex. 12 | 1450 | 0.2 | 25 | 28 | 3.7 | 1.8 |
| Ex. 27 | 1450 | 0.5 | 32 | 34 | 0.9 | 0.3 |
| Ex. 28 | 1450 | 1 | 31 | 35 | 0.8 | 0.3 |
| Ex. 29 | 1450 | 8 | 33 | 36 | 0.7 | 0.3 |
| Com. Ex. 13 | 1500 | 8 | 24 | 28 | 4.2 | 1.8 |
| Com. Ex. 14 | 1600 | 8 | 21 | 24 | 5.2 | 2.7 |

Examples 30 to 39 and Comparative Examples 15, 16

The ceramics produced under the conditions of Example 1 were subjected to a HIP treatment in order to improve the extinction ratio and the scattering coefficient. Table 5 shows the extinction ratio and the scattering coefficient obtained when the HIP treatment was performed at various temperatures and pressures, while the time for which the ceramics were held at the treatment temperature was fixed at 3 hours. In the HIP treatment, an Ar gas was used as a pressure medium. By performing the HIP treatment at a treatment temperature of 1000° C. to 1450° C. and a pressure of 45 MPa to 200 MPa, the extinction ratio was increased to 40 dB or more and the scattering coefficient was reduced to 0.1%/cm at a wavelength of 1064 nm, and the extinction ratio was increased to 38 dB or more and the scattering coefficient was reduced to 0.3%/cm or less at a wavelength of 633 nm. However, when the treatment temperature was 950° C. and the pressure was 196 MPa, or when the treatment temperature was 1200° C. and the pressure was 45 MPa, the micropores inside the sintered body were not sufficiently removed. Accordingly, the extinction ratio and the scattering coefficient were not improved. In addition, when the HIP treatment temperature was 1500° C. or more, abnormal grain growth occurred in a part of the microstructure, resulting in an increase in the scattering coefficient and a reduction in the extinction ratio. From the foregoing, a treatment temperature of 1000° C. to 1450° C. and a pressure of 45 MPa to 200 MPa are preferable. The HIP treatment time is, for example, 0.5 hours or more and 12 hours or less.

TABLE 5

Examples 30 to 39, Comparative Examples 15, 16

| Sample | Treatment temperature/° C. | Pressure/ MPa | Extinction ratio/dB (Measurement wavelength 633 nm) | Extinction ratio/dB (Measurement wavelength 1064 nm) | Scattering coefficient/%/cm (Measurement wavelength 633 nm) | Scattering coefficient/%/cm (Measurement wavelength 1064 nm) |
|---|---|---|---|---|---|---|
| Ex. 30 | 950 | 196 | 38 | 40 | 0.4 | 0.1 |
| Ex. 31 | 1020 | 196 | 38 | 41 | 0.3 | 0.1 |
| Ex. 32 | 1200 | 49 | 40 | 43 | 0.3 | 0.1 |
| Ex. 33 | 1300 | 45 | 41 | 45 | 0.3 | 0.1 |
| Ex. 34 | 1300 | 100 | 43 | 46 | 0.3 | 0.1 |
| Ex. 35 | 1300 | 196 | 45 | 47 | 0.2 | 0.1 |
| Ex. 36 | 1350 | 150 | 46 | 48 | 0.1 | 0.1 |
| Ex. 37 | 1400 | 100 | 45 | 47 | 0.2 | 0.1 |
| Ex. 38 | 1450 | 100 | 44 | 46 | 0.3 | 0.1 |
| Ex. 39 | 1450 | 196 | 43 | 45 | 0.3 | 0.1 |
| Com. Ex. 15 | 1500 | 49 | 32 | 34 | 4 | 1.4 |
| Com. Ex. 16 | 1550 | 196 | 25 | 28 | 4.9 | 1.8 |

Examples 40 to 43

Ceramics with varied Ge concentrations an Al concentrations were produced under the same preparation conditions as those in Example 1. The results are shown in Table 6.

TABLE 6

Examples 40 to 43

| Sample | Sample conditions | | Extinction ratio/dB (Measurement wavelength 633 nm) | Extinction ratio/dB (Measurement wavelength 1064 nm) | Scattering coefficient/%/cm (Measurement wavelength 633 nm) | Scattering coefficient/%/cm (Measurement wavelength 1064 nm) |
|---|---|---|---|---|---|---|
| | Ge | Al | | | | |
| Ex. 40 | 10 mass ppm | 20 mass ppm | 35 | 37 | 0.9 | 0.2 |
| Ex. 41 | 10 mass ppm | 200 mass ppm | 33 | 36 | 0.8 | 0.3 |
| Ex. 42 | 500 mass ppm | 20 mass ppm | 34 | 34 | 0.6 | 0.2 |
| Ex. 43 | 500 mass ppm | 200 mass ppm | 33 | 34 | 0.6 | 0.3 |

Optical Isolator

FIG. 1 shows the structure of an optical isolator 2. Reference numeral 4 denotes a Faraday rotator that is obtained by mirror-polishing both ends of a translucent rare-earth gallium garnet ceramic according to the examples, and applying an anti-reflection coating thereto. Reference numeral 6 denotes a lateral pair of polarizers, and the angles of planes of polarization thereof were made different from each other by 45°. Reference numeral 8 denotes a permanent magnet that applies a magnetic field to the Faraday rotator 4 such that the plane of polarization of transmitted light is rotated by 45°. With this configuration, the light from a laser passes through the optical isolator 2 as linearly polarized light. When the laser light is reflected back to the optical isolator 2, the plane of polarization is further rotated by 45°. Accordingly, the plane of polarization is displaced by 90° relative to the polarizer, and therefore the reflected light will not return to the laser side.

DESCRIPTION OF REFERENCE NUMERALS

2 Optical isolator
4 Faraday rotator
6 Polarizer
8 Permanent magnet
10 Housing

The invention claimed is:

1. A translucent rare-earth gallium garnet ceramic comprising a general formula $R_3Ga_5O_{12}$ where R is at least one element selected from the group consisting of Y and rare-earth elements having an atomic number of 57 to 71, and
to which, as a sintering aid, 5 mass ppm or more and 500 mass ppm or less of Ge calculated as metal, and 20 mass ppm or more and 250 mass ppm or less of Al calculated as metal is added based on the amount of the ceramic.

2. The translucent rare-earth gallium garnet ceramic according to claim 1,
characterized in that the translucent rare-earth gallium garnet ceramic contains 20 mass ppm or more and 200 mass ppm or less of Al.

3. The translucent rare-earth gallium garnet ceramic according to claim 1,
characterized in that an extinction ratio at a wavelength of 1064 nm is 35 dB or more.

4. The translucent rare-earth gallium garnet ceramic according to claim 2,
characterized in that an extinction ratio at a wavelength of 1064 nm is 35 dB or more.

5. A Faraday rotator comprising a translucent rare-earth allium garnet ceramic comprising a general formula $R_3Ga_5O_{12}$ where R is at least one element selected from the group consisting of Y and rare-earth elements having an atomic number of 57 to 71,
characterized in that the translucent rare-earth gallium garnet ceramic additionally contains, as a sintering aid, 5 mass ppm or more and 500 mass ppm or less of Ge calculated as metal, and 20 mass ppm or more and 250 mass ppm or less of Al calculated as metal based on the amount of the ceramic.

6. The Faraday rotator according to claim 5,
characterized in that the translucent rare-earth gallium garnet ceramic contains 20 mass ppm or more and 200 mass ppm or less of Al.

7. A method for producing a translucent rare-earth gallium garnet ceramic comprising a general formula $R_3Ga_5O_{12}$ where R is at least one element selected from the group consisting of Y and rare-earth elements having an atomic number of 57 to 71, characterized by comprising:
a step of preparing a rare earth oxide powder having a purity of 99.9% or more to which, as a sintering aid, 5 mass ppm or more and 500 mass ppm or less of Ge calculated as metal and 20 mass ppm or more and 250 mass ppm or less of Al calculated as metal is added based on the amount of the ceramic;
a step of molding the powder with addition of a binder into a molded article having a molding density of 55% or more relative to a theoretical density; and
a step of heat-treating the molded article to remove the binder, followed by firing in hydrogen, a rare gas, a mixed gas of hydrogen and a rare gas, or in vacuum at 1250° C. to 1450° C. for 0.5 hours or more and 72 hours or less.

8. The method for producing a translucent rare-earth gallium garnet ceramic according to claim 7,
characterized in that a step of subjecting the ceramic obtained by the firing to a hot isostatic pressurized heat treatment at a treatment temperature of 1000° C. to 1450° C. and a pressure of 45 MPa to 200 MPa is performed.

* * * * *

UNITED STATES PATENT AND TRADEMARK OFFICE
CERTIFICATE OF CORRECTION

PATENT NO.        : 10,012,850 B2
APPLICATION NO.   : 14/397943
DATED             : July 3, 2018
INVENTOR(S)       : Hoshiteru Nozawa et al.

Page 1 of 1

It is certified that error appears in the above-identified patent and that said Letters Patent is hereby corrected as shown below:

In the Claims

Column 12, Line 19, Claim 5, delete "allium" and insert -- gallium --

Signed and Sealed this
Second Day of October, 2018

Andrei Iancu
*Director of the United States Patent and Trademark Office*